A. A. LOCKWOOD.
AMALGAMATING APPARATUS.
APPLICATION FILED SEPT. 19, 1911.
1,043,611.
Patented Nov. 5, 1912.
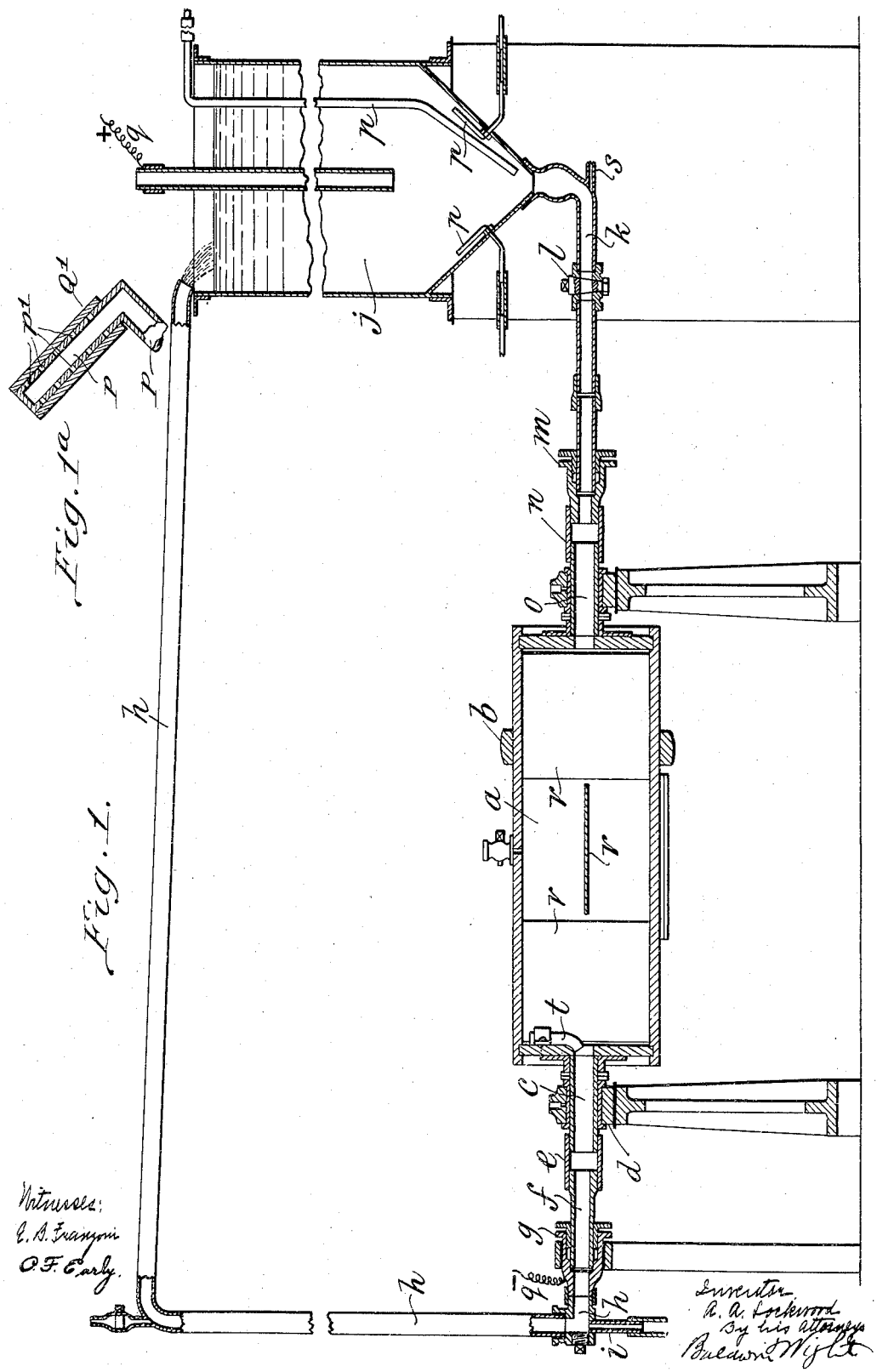

UNITED STATES PATENT OFFICE.

ALFRED ANDREW LOCKWOOD, OF HONOR OAK, ENGLAND, ASSIGNOR TO TURBO AMALGAMATOR AND EXTRACTION COMPANY, LIMITED, OF LONDON, ENGLAND.

AMALGAMATING APPARATUS.

1,043,611.  Specification of Letters Patent.  Patented Nov. 5, 1912.

Application filed September 19, 1911. Serial No. 650,203.

*To all whom it may concern:*

Be it known that I, ALFRED ANDREW LOCKWOOD, a subject of the King of Great Britain, residing at 46 Marmora road, Honor Oak, in the county of Surrey, England, have invented a new and useful Amalgamating Apparatus, of which the following is a specification.

This invention relates to apparatus for amalgamating precious metals.

According to this invention the apparatus comprises a tank or reservoir to which ore pulp is supplied and where it may be aerated and agitated, a revolving vessel provided with copper plates for lifting the mercury contained in the vessel, a pipe connecting one side of said vessel with the reservoir, a pipe for connecting the other side of the vessel with the upper part of the reservoir, and means such as an air blast for lifting the liquid passing out of the revolving vessel to assist its return to the reservoir from which the liquid again passes to the revolving vessel where amalgamation again takes place.

In the accompanying drawings:—Figure 1 is a diagrammatic sectional view of apparatus which may be employed for carrying out my invention. Fig. 1ª is a detail view of devices employed for aerating and agitating the ore pulp in the reservoir.

*a* is an amalgamating vessel of wood (but it may be of iron) provided with a pulley *b* by which it may be rotated. From this vessel leads a pipe *c* which acts as a trunnion and is supported in a bearing *d*. This pipe is united by a short rubber connection *e* to a pipe *f* which can rotate in a stuffing box *g* from which leads a pipe *h*. Into the constricted space formed by this pipe *a* blast of air can be introduced by the pipe *i*. The pipe *h* opens into the top of a tank *j* from which a pipe *k* (provided with a stop cock *l*) stuffing box *m*, rubber connection *n* and pipe *o*, which latter also acts as a trunnion for the amalgamating vessel lead again to that vessel. *p p* are pipes closed at their ends and perforated at their sides, through which perforations air can be introduced to aerate and agitate the contents of the tank; the perforated portions *p'* of the pipes are covered with rubber tubes Q' which serve as non return valves.

In place of or in addition to the introduction of air through the pipe *i*, air may be introduced through a pipe *s* pressure within the vessel *a* being relieved at each revolution by a pipe *t*. If the vessel be of iron, it should be built in sections insulated from each other.

The process may be conducted as follows:—Into the apparatus is run a cyanid solution of any usual strength in which a charge of ore is suspended any usual compounds being if necessary added to neutralize acidity; air is blown through the pipes *p* to aerate the pulp to keep it in agitation and to prevent the choking of the outlet. The pulp flowing out of the tank *j* passes into the amalgamating vessel *a* which contains say one to ten pounds of mercury for every ton of ore according as the plant is adapted to treat large or comparative small quantities of ore. The vessel *a* is continuously rotated, the copper plates *r* continuously lifting the mercury and keeping a portion of it in a state of division. Gold is deposited upon the plates *r* and comes in contact with the mercury passing over said plates. The pulp together with the mercury continuously flows out of the vessel *a* and is met by a blast of air from the pipe *i* which aerates and agitates the pulp and mercury in the confined space of pipe *h* and aids its return to the top of the tank *j*.

The circulation and agitation are continued until the extraction is considered satisfactory. When the extraction is satisfactory, the pulp is run into a settler or other suitable appliance, the mercury and amalgam separated, and treated in the usual way. The waste product is run to dump and any coarse particles of ore or loose amalgam left in the bottom of the settler are collected and treated in another charge or otherwise.

The process herein described is claimed in my application for Patent No. 650,204, filed Sept. 19, 1911.

What I claim is:—

1. In an apparatus for amalgamating precious metals, the combination of a pulp reservoir, a horizontally arranged revoluble mercury containing vessel of smaller capacity than the reservoir, copper plates within said reservoir for lifting the mercury therein, a pipe connecting one side of said vessel with said reservoir, a pipe connecting the opposite side of said vessel with the upper part of the reservoir, and means for giving the necessary extra lift to the liquid passing from the amalgamating vessel to assist its return to the reservoir.

2. In apparatus for amalgamating precious metals, the combination of a pulp reservoir, a horizontally arranged revoluble mercury containing vessel of smaller capacity than the reservoir, copper plates within said vessel for lifting the mercury therein, a pipe connecting one side of said vessel with the lower portion of said reservoir, a pipe connecting the opposite side of said vessel with the upper part of the reservoir, and means for supplying air to the pipe leading from the amalgamating vessel to assist the liquid from said vessel in rising to a point above the liquid level in the reservoir whereby a continuous circulation of liquid to and from the reservoir and horizontally through the amalgamating vessel may be obtained.

3. In an apparatus for amalgamating precious metals, the combination of a pulp reservoir, a horizontally arranged revoluble mercury containing vessel of smaller capacity than the reservoir, copper plates within said vessel for lifting the mercury therein, a pipe connecting one side of said vessel with said reservoir, a pipe connecting the opposite side thereof with the upper part of the reservoir, means for aerating and agitating the liquid in the reservoir, and means for supplying air to the pipe connections between the amalgamating vessel and the reservoir to lift the liquid passing from the vessel and assist its return to the reservoir whereby a continuous circulation of the liquid to and from the reservoir and horizontally through the amalgamating vessel may be obtained.

ALFRED ANDREW LOCKWOOD.

Witnesses:
MARCUS R. A. SAMUEL,
JOHN NOYES.